US 6,687,828 B1

(12) United States Patent
Sako et al.

(10) Patent No.: US 6,687,828 B1
(45) Date of Patent: Feb. 3, 2004

(54) METHOD AND APPARATUS FOR CIPHERING PLAYBACK MODE INFORMATION FOR RECORDING ON RECORD MEDIUM

(75) Inventors: Yoichiro Sako, Chiba (JP); Yoshitomo Osawa, Kanagawa (JP); Akira Kurihara, Tokyo (JP); Isao Kawashima, Kanagawa (JP); Shigeyuki Yoneyama, Tokyo (JP)

(73) Assignee: Sony Corporation, Tokyo (JP)

( * ) Notice: Subject to any disclaimer, the term of this patent is extended or adjusted under 35 U.S.C. 154(b) by 515 days.

(21) Appl. No.: 09/580,965

(22) Filed: May 30, 2000

Related U.S. Application Data

(62) Division of application No. 09/396,398, filed on Sep. 15, 1999, which is a continuation of application No. 08/694,327, filed on Aug. 8, 1996, now Pat. No. 6,009,170.

(30) Foreign Application Priority Data

Aug. 11, 1995 (JP) .............................. 7-206351

(51) Int. Cl.[7] .............................. G06F 11/30
(52) U.S. Cl. .................. 713/193; 713/167; 360/27; 380/201
(58) Field of Search .................. 705/57; 713/167, 713/193, 189; 714/770, 769, 771; 369/84; 360/55, 60, 27; 380/201

(56) References Cited

U.S. PATENT DOCUMENTS

| 5,057,947 A | 10/1991 | Shimada |
| 5,153,861 A | * 10/1992 | Maeda et al. ................ 369/32 |
| 5,185,792 A | 2/1993 | Shimada et al. |
| 5,315,448 A | 5/1994 | Ryan |
| 5,418,852 A | * 5/1995 | Itami et al. ................ 380/4 |
| 5,418,853 A | 5/1995 | Kanota et al. |
| 5,453,968 A | 9/1995 | Veldhuis et al. |
| 5,555,304 A | * 9/1996 | Hasebe et al. .............. 713/193 |
| 5,570,339 A | 10/1996 | Nagano |
| 5,673,357 A | 9/1997 | Shima |
| 5,689,559 A | 11/1997 | Park |
| 5,719,937 A | 2/1998 | Warren et al. |
| 5,761,301 A | 6/1998 | Oshima et al. |
| 5,799,081 A | 8/1998 | Kim et al. |

OTHER PUBLICATIONS

Bruce Schneier, Applied Cryptography, Second Edition, 1996, p. 270.*

* cited by examiner

Primary Examiner—Ayaz Sheikh
Assistant Examiner—Chi-Chung Lee
(74) Attorney, Agent, or Firm—Frommer Lawrence & Haug LLP; William S. Frommer; Glenn F. Savit

(57) ABSTRACT

A signal transmission method applicable to prevention of modification or alteration of the playback mode information, such as copying management information or charging information. The playback mode information form a terminal 15P is data-converted for ciphering by a playback mode information appendage circuit 14 in a header appendage circuit 13 responsive to the key information from a terminal 15K and the resulting information comprised of the data and the playback mode information is outputted. The reproducing side effects data conversion on the ciphered playback mode information for deciphering, by a playback mode information detection circuit 26 in a header separation circuit 25, using the key information from a terminal 27K, for taking out the original playback mode information at a terminal 27P.

17 Claims, 6 Drawing Sheets

METHOD AND APPARATUS FOR CIPHERING PLAYBACK MODE INFORMATION FOR RECORDING ON RECORD MEDIUM

This application is a Divisional application of application Ser. No. 09/396,398 filed Sep. 15, 1999, which is a Continuation application of application Ser. No. 08/694,327, filed Aug. 8, 1996, now U.S. Pat. No. 6,009,170.

BACKGROUND OF THE INVENTION

1. Field of the Invention

This invention relates to a signal transmission method, a signal record (recording, recordable or recorded) medium and a signal reproducing apparatus applicable to prevention of copying or unauthorized use of transmitted or recorded and/or reproduced signals, or to a charging system.

2. Description of the Related Art

With promulgation and increased capacity of a digital record medium, such as an optical disc, prevention of copying and unauthorized use thereof is becoming crucial. That is, digital audio data or digital video data can be copied or dubbed to produce a non-deteriorated duplicate, while computer data can be easily copied to produce the same data as the original data. The result is that the copyright tends to be infringed by unauthorized copying.

With a view to preventing unauthorized copying, a standard for recording the information for preventing unauthorized copying on the record medium for original data has been proposed and used.

In an unauthorized copying preventing system in a digital audio signal recording/reproducing apparatus, termed a rotary head digital audio tape recorder (R-DAT), an inhibition code for inhibiting copying of digital data or inhibiting copying of a generation exceeding a pre-set number, that is for limiting the copying generation, or a so-called inhibition code of the standard of the serial copying management system (SCMS), is recorded in a main data area for digital audio signals recorded on a digital audio tape as a signal record medium. If this inhibition code is detected by the digital audio signal recording apparatus, the digital audio signals are prohibited from being recorded on a new digital audio tape.

For preventing copying of, for example, digital video signals, recorded on a signal record medium, it is also proposed in JP Patent Kokai Publication JP-A-6-44755 (1994) to record pre-set ID bits, that is the inhibition code of a standard for copying generation management system (CGMS), on an original digital record medium, as in the case of the above-mentioned system for prevention of unauthorized copying among recording/reproducing apparatus for R-DAT.

In the case of computer data, the file contents themselves are ciphered using the ciphering key information to permit use only by authorized registered users. This is pertinent to a system in which a digital record medium with the information is ciphered and recorded thereon is distributed as a form of information circulation, and the user acquires the key information for the contents he or she needs on payment of a prescribed fee for deciphering and using the computer data.

However, as shown in JP Patent Kokai Publication No. 5-173891 (1993), the above-mentioned ciphering key information or inhibition code for the signal record medium is recorded on a specified site on the record medium proper to the system and which is accessed by the user.

On the other hand, with playback mode information, such as copying management information or charging information, since bit allocation or the data position on the record medium is pre-fixed, there is a risk that the information will be skipped in reading or altered in use. In other words, since the playback mode information, such as the copying management information or the charging information, is at a user accessible area, it is likely to be decoded or illegally copied by a user having a malignant intention.

In addition, if the playback mode information is arrayed in a fixed manner in an optional place depending on the particular ciphering technique, interchangeability tends to be lost. If the playback mode information is arrayed fixedly, the ciphering technique is also fixed, so that it becomes poor in flexibility and extendibility, while durability of the format itself is likely to be lowered.

This problem is raised not only when recording/reproducing or, transmitting/receiving digital signals but also when transmitting analog signals.

SUMMARY OF THE INVENTION

It is therefore an object of the present invention to provide a signal transmission method, a signal record (recording, recordable or recorded) medium and a signal reproducing apparatus which renders it difficult to make unauthorized use or duplication by modification or alteration of the playback mode information such as the copying management information or the charging information.

According to the present invention, the playback mode information appended to a signal to be transmitted or recorded is data-converted in accordance with the ciphering key information.

The playback mode information includes the copying management information and/or the charging information, and is desirably arrayed at a position designated by the pre-set position designation information.

According to the present invention, the playback mode information is arrayed at a position designated by the pre-set position designation information.

The ciphered playback mode information is difficult to alter because its contents cannot be known in the absence of the key information, thus preventing alteration and preventing unauthorized listening or copying. The playback mode information, arrayed at the position designated by the key designation information, cannot be taken out with ease, thus further improving the effect in preventing unauthorized use.

If the non-ciphered playback mode information is arrayed at a position designated by the pre-set position designation information, the playback mode information cannot be taken out with ease, thus preventing alteration and unauthorized use of the playback mode information.

DESCRIPTION OF THE PREFERRED EMBODIMENTS

Figure 1:
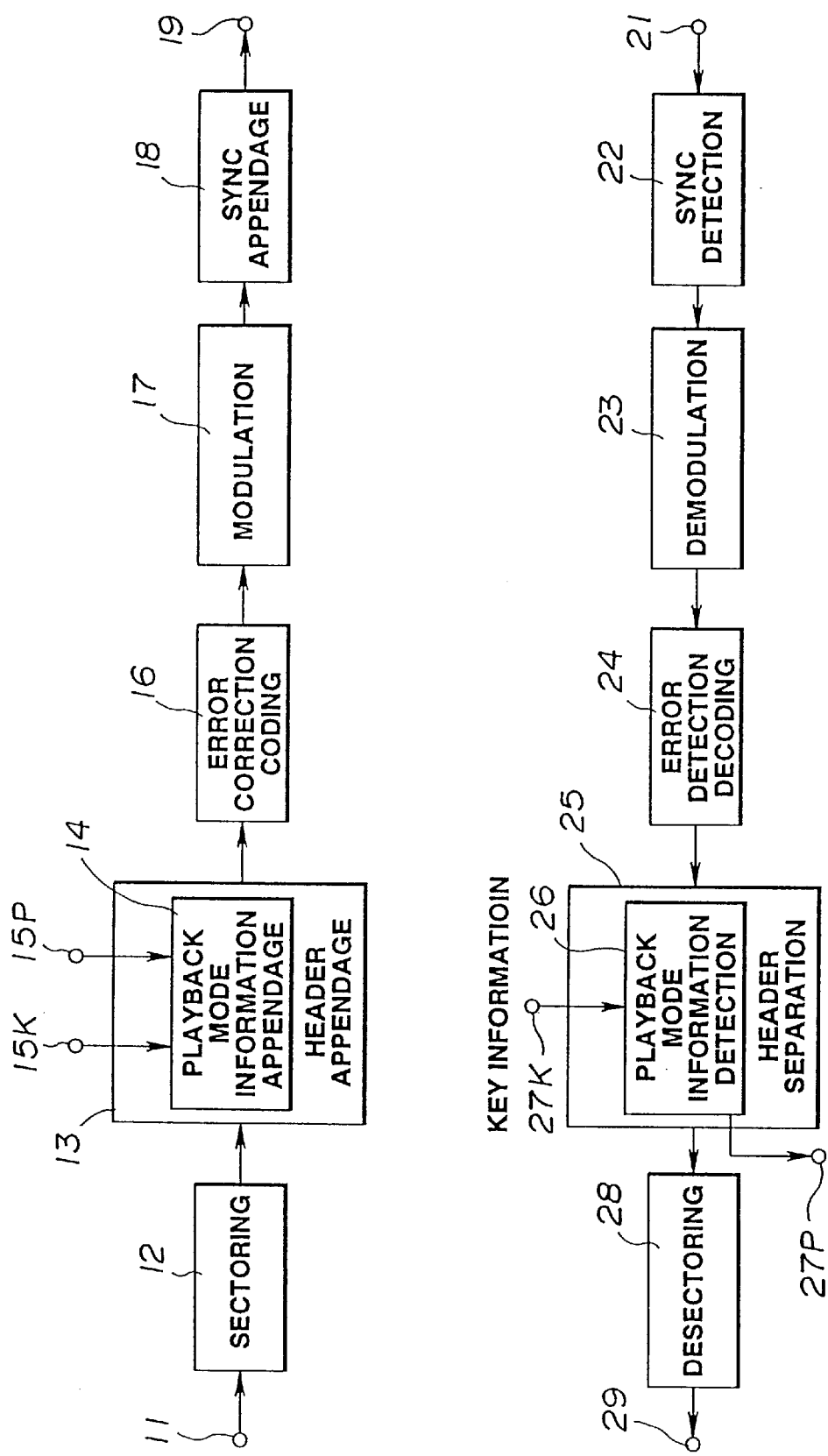
FIG. 1 is a block diagram showing an example of an illustrative arrangement according to the present invention.

Referring to the drawings, preferred embodiments of the present invention will be explained in detail.

FIG. 1 shows, in a schematic block diagram, an embodiment of an arrangement according to the present invention.

In FIG. 1, digital data, such as data obtained on digital conversion of analog audio signals or video signals, or computer data, is supplied to an input terminal 11. The input digital data is sent to a sectorizing circuit 12 so as to be sectorized in terms of a pre-set data volume, such as 2048 bytes, as a unit. The sectorized data is sent to a header appendage circuit 13 where header data is appended at the leading end of each sector. The playback mode information, comprised of at least one of the copying management information and the charging information, is contained in the header data, as later explained. The original playback information is also supplied to a terminal 15P of a playback information appendage circuit 14. The playback information appendage circuit 14 data-converts the original playback information for ciphering, responsive to the key information from a terminal 15K, for appendage of the converted playback mode information. Output data of the header appendage circuit 13 is sent to an error correction coding circuit 16 where parity is appended by data delay and parity calculations. Output data of the error correction coding circuit 16 is supplied to a modulation circuit 17 where 8-bit data, for example, is converted in accordance with a pre-set modulation system into 16 channel-bit modulated data which is sent to a synchronization appendage circuit 18. The synchronization appendage circuit 18 appends synchronization signals of the out-of-rule pattern, violating the modulation rule of the pre-set modulation system, in terms of a pre-set data volume as a unit, and outputs the resulting data. And the output signal from the syncronization appendage circuit 18 is sent to, for example, a recording head 19 so as to be recorded on a data record (recording, recordable or recorded) medium 101, such as a disc or tape record medium, or a semiconductor record medium, or transmitted over a communication medium. The reproduced signal which is reproduced from the record medium by a playback head 21, or a received signal which is received via a communication medium, is supplied to a synchronization detection circuit 22. The signal supplied to the input is the same signal as that outputted to the recording head 19, if signal deterioration by record or transmission is disregarded.

The signal from the playback head 21 or the communication medium is sent to a synchronization detection circuit 22 for separation of the synchronization signal appended by the synchronization appendage circuit 18. The digital signal from the synchronization detection circuit 22 is sent to a demodulation circuit 23 for demodulating the modulated signal by the modulation circuit 17. Specifically, the demodulation is such processing of converting the 16 channel-bit data into 8-bit data. The digital data from the demodulation circuit 23 is sent to an error correction decoding circuit 24 where decoding as a reverse operation of encoding by the error correction encoding circuit 16 is executed. The data from the error correction decoding is sent to a header separation circuit 25 where the header in the leading portion of each sector is separated. The playback information in the header data has been converted by ciphering using the key information as described previously. Thus the playback mode information is converted by deciphering by the playback mode information detection circuit 26 using key information from a terminal 27K so that the decoded playback mode information is provided at the terminal 27P. The data freed of the header by the header separation circuit 25, that is the so-called user data, is sent to a sector resolution circuit 28 where the user data is resolved into sectors, each having the pre-set data volume unit. The user data is provided at an output terminal 29.

Figure 2:
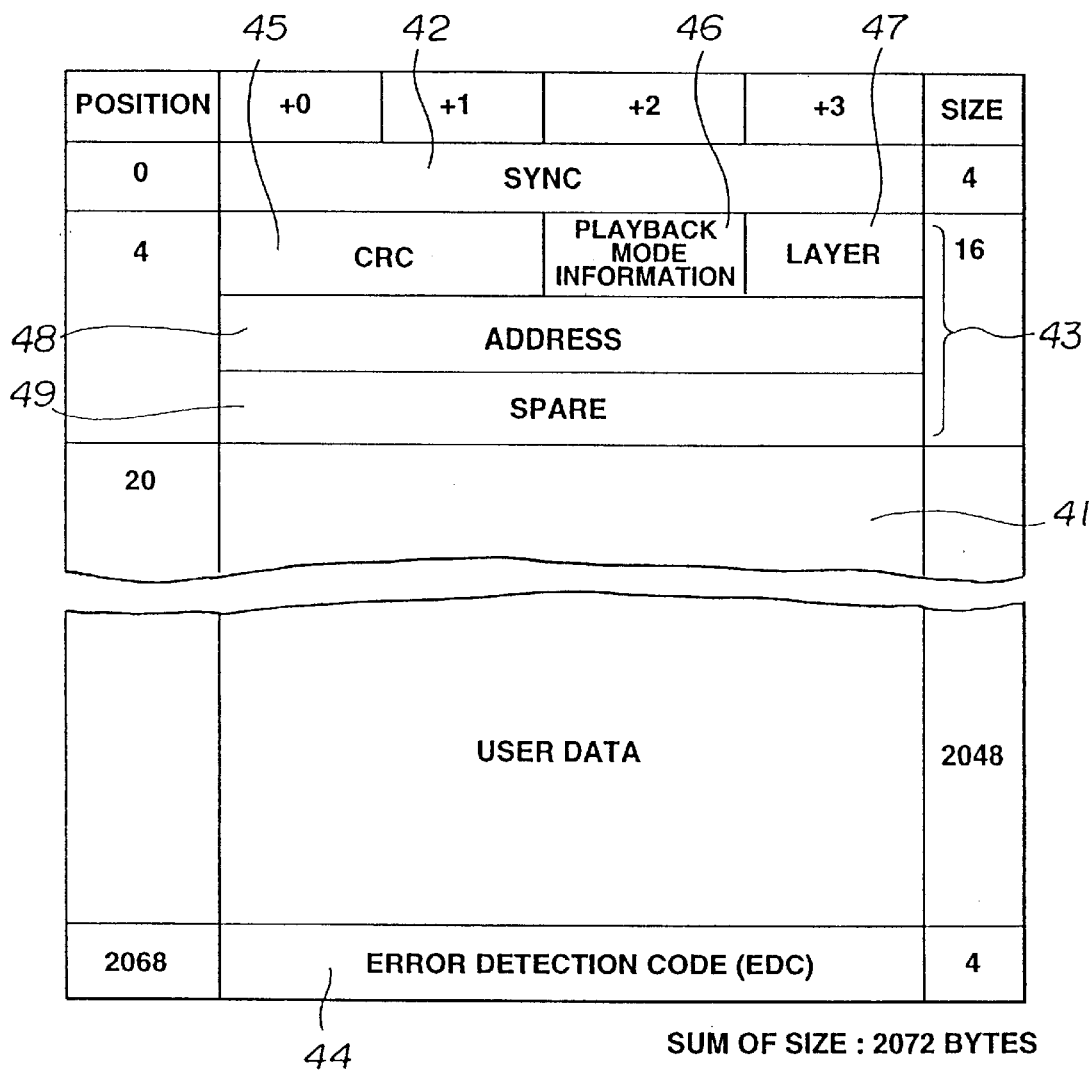
FIG. 2 illustrates an example of a sector format.

FIG. 2 shows an illustrative example of a sector format, each sector having, for a 2048-byte user data area 41, a 4-byte synchronization area 42, a 16-byte header area 43 and a 4-byte error detection code (EDC) area 44. The error correction code of the error detection code area 44 is comprised of a CRC code of 32 bits (4 bytes) generated for the user area 41 and the header area 43. In the header area 43, there are a CRC (cyclic redundancy code) area 45, the playback mode information area 46, a layer specifying one of the layers of a multi-layered disc, an address area 48 and a spare area 49.

Figure 3:
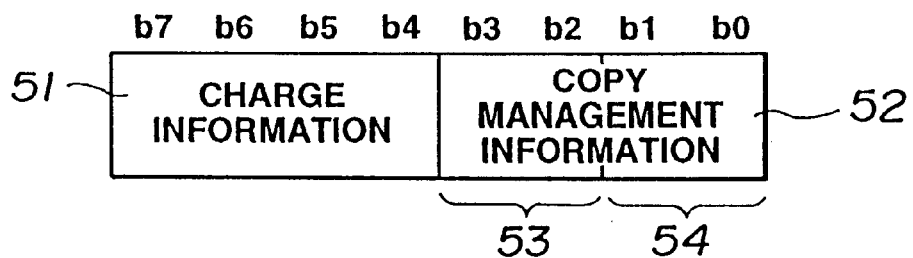
FIG. 3 illustrates an example of the playback mode information.

The playback mode information 46 is comprised of one-byte (eight bits) and configured as shown in FIG. 3, in which the 8-bit playback mode information is made up of upper four bits of the charging information 51 and lower four bits of the copying management information 52. The charging information 51 may be exemplified by codes or flags specifying whether the file or the program including the file is charge-free or charged for viewing by a pay-per-view system or copying by a pay-per-copy system. The 4-bit copy management information 52 is further divided into a two-bit copying generation data 53 and two-bit copy permit/inhibit data 54. The two-bit copying generation data 53 specifies the original, first copying generation, second copying generation and third or higher copying generation by "00", "01", "10" and "11", respectively. The two-bit copy permit/inhibit data 54 specifies copy free, copy permitted up to the second generation, copy permitted only for the first generation and copy not permitted by "00", "10", "10" and "11", respectively.

In transmitting data, for recording or transmission, for example, the original playback mode information, comprised of the charging information or the copy management information 52, is not directly used, but ciphered in accordance with the pre-set key information. This ciphered playback mode information is arrayed at a pre-set position in the sector header area 43, that is at the position of the playback mode information 46.

Figure 4:
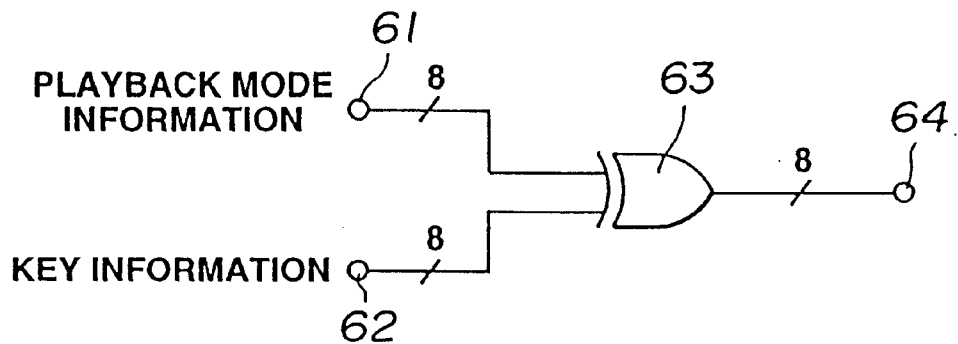
FIG. 4 illustrates an embodiment of a data conversion circuit for ciphering.

FIG. 4 shows an illustrative example of converting the 8-bit playback mode information by way of data conversion for ciphering using the 8-bit key information. That is, in FIG. 4, the original playback mode information is supplied to an input terminal 61, while the 8-bit key information is supplied to an input terminal 62. These bit data all sent to an ExOR circuit 63 so as to be Ex-ORed on the bit basis to form the 8-bit ciphered playback mode information which is taken out at an output terminal 64. As the key information, for example, identification information is used as mentioned later.

If the ciphering is performed in this manner using the key information, the contents of the original playback mode cannot be known in the absence of the key information, such that unauthorized acts such as modification or alteration of the contents can be prevented effectively.

Figure 5:
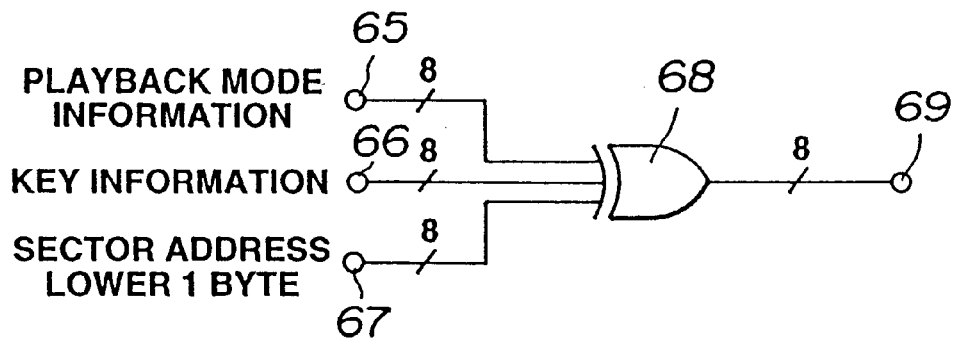
FIG. 5 illustrates another embodiment of a data conversion circuit for ciphering.

FIG. 5 shows an example in which data conversion for ciphering is performed using not only the key information but also the 8-bit address information, for example the lower one byte of the sector address. That is, in the example of FIG. 5, the original playback mode information, the 8-bit key information and the lower one byte (8 bits) of the sector address are supplied to input terminals 65, 66 and 67, respectively. These three types of 8-bit data are sent to an Ex-OR circuit 68 so as to be Ex-ORed on a bit by bit basis to produce the 8-bit ciphered playback mode information which is outputted at an output terminal 69.

By employing part of the sector address for data conversion for ciphering, the ciphered playback mode information is varied from sector to sector for further improving the effect in preventing alteration or unauthorized use.

Meanwhile, data conversion for ciphering is not limited to the examples of FIGS. 4 and 5. For example, a pseudo-random number of the M sequence may be used for data conversion. Logic operations by AND, OR, ExOR, NAND, NOR, invertor circuits or combination circuits thereof may also be used in place of the ExOR circuit. The translocation of changing the data positions or substitution of substituting data values may also be used for data conversion in place of the logical operations.

Figure 6:
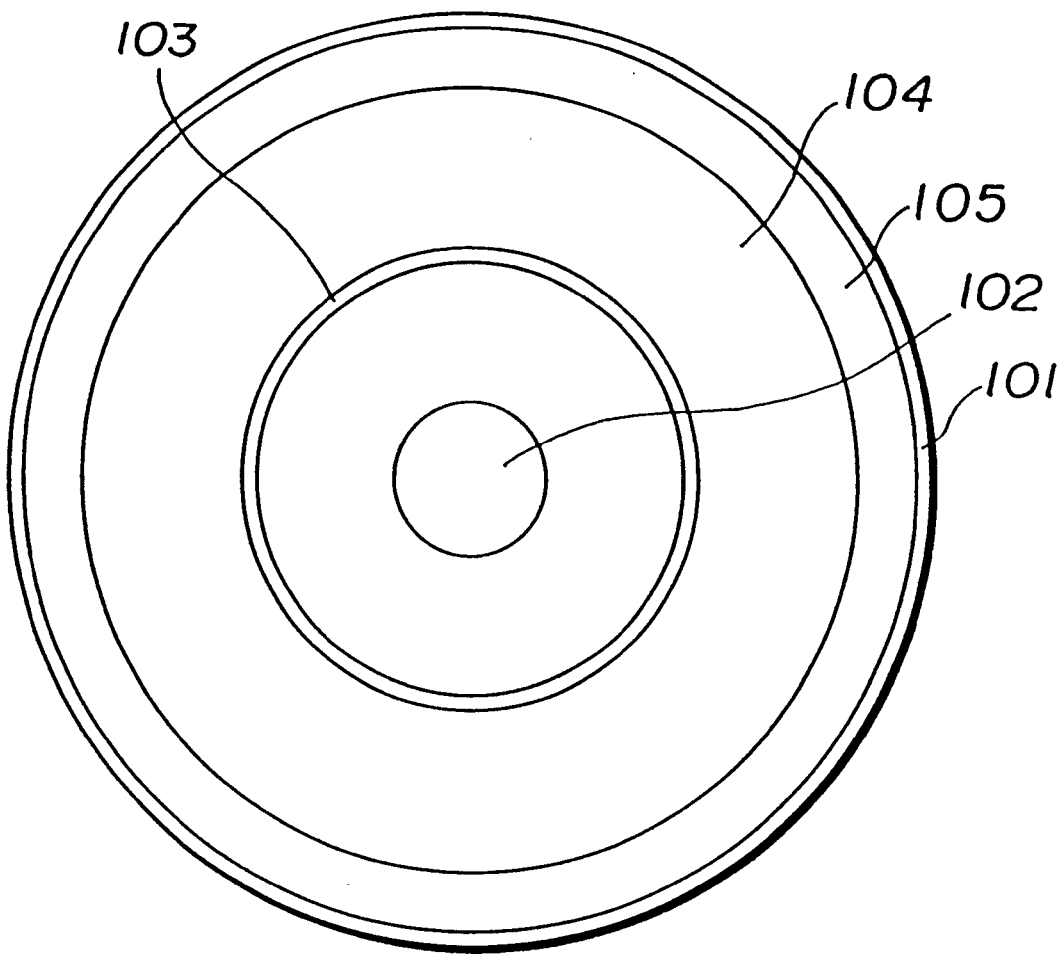
FIG. 6 illustrates an example of a data record medium.

FIG. 6 shows a disc-type record medium 101, such as an optical disc, as an example of the record medium. The disc-type record medium 101 has a center aperture 102 and, looking from the inner rim towards the outer rim thereof, a lead-in area 103, providing a program management area, a program area 104 in which program data is recorded, and a lead-out area 105, providing a program end area. In the case of an optical disc for reproducing audio or video data, audio or video data is recorded in the program area 104, while the timing information for the audio data or the video data is managed by the lead-in area 103.

As part of the key information, the identification information written in an area other than the program area 104 as the data recording area may be used. Specifically, the identification information, such as production number associated with the record medium, the producer identification information, distributer identification information, identification information associated with the recording device or the encoder, or identification information of the device for producing the record medium, such as a cutting machine or a stamper, may be written in the lead-in area 103 as the TOC area or in the lead-out area 105. That is, the identification information as the key information is recorded in the TOC area by using the recording head 19 to which the information is sent. For reproduction, the identification information may be used as the key information for deciphering by reproducing from the TOC area by using the reproducing head 21. The identification information may be written physically or chemically in an area inwardly of the lead-in area 103 so as to be read out during reproduction and used as the key information for deciphering.

The playback mode information may be recorded at an optional position without fixing the recording position, in which case the position designating information for designating the recording position of the playback mode information may be written in a pre-set area such as a TOC area in the lead-in area 103. In such case, the recording position for the playback mode information may be directly designated by the position designation information in the TOC area 103. Alternatively, the pointer in the data may be designated by the position designation information in the TOC area, with the recording position for the playback mode information being then designated by the pointer.

Figure 7:
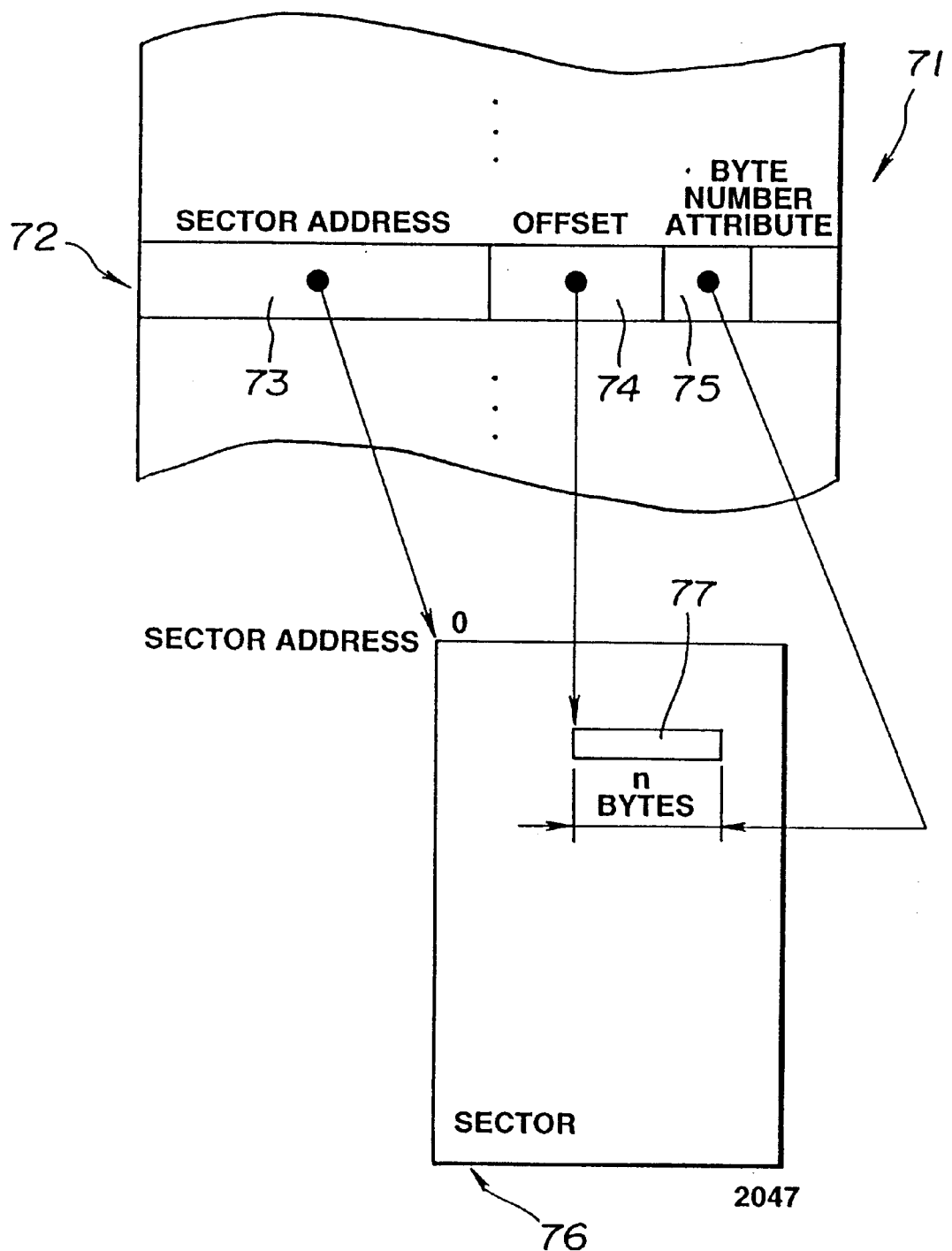
FIG. 7 illustrates an example of designating the recording position of the playback mode information by a pointer.

FIG. 7 shows an example of designating the recording position for the playback mode information by a pointer 72 as the position designation information in a TOC data area 71. In FIG. 7, the pointer 72 for designating the recording position for the playback mode information is made up of sector address data 73, offset data 74, byte number data 76 and attribute data. The sector address data 73, the offset data 74 and the byte number data 75 designate a pre-set sector 76, an offset of the playback mode information in the sector 76, that is the number of bytes from the leading position of the sector up to the playback mode information 77, and the number of bytes of the playback information mode 77 itself, respectively.

Since the recording position for the playback mode information is not fixed, it becomes possible to prevent the risk of extraction of the playback mode information, such as the copying management information, from the same fixed recording position.

Although the playback mode information is modified for ciphering using the key information or addresses as described above, the original playback mode information, that is the playback mode information that exists prior to such conversion, may also be employed.

The distribution identification number, producer identification number or the recording device identification number may also be employed for the offset or the sector address of the pointer.

The foregoing description has been made of transmission of digital data signals. However, the present invention may also be applied to transmission of analog signals.

Figure 8:
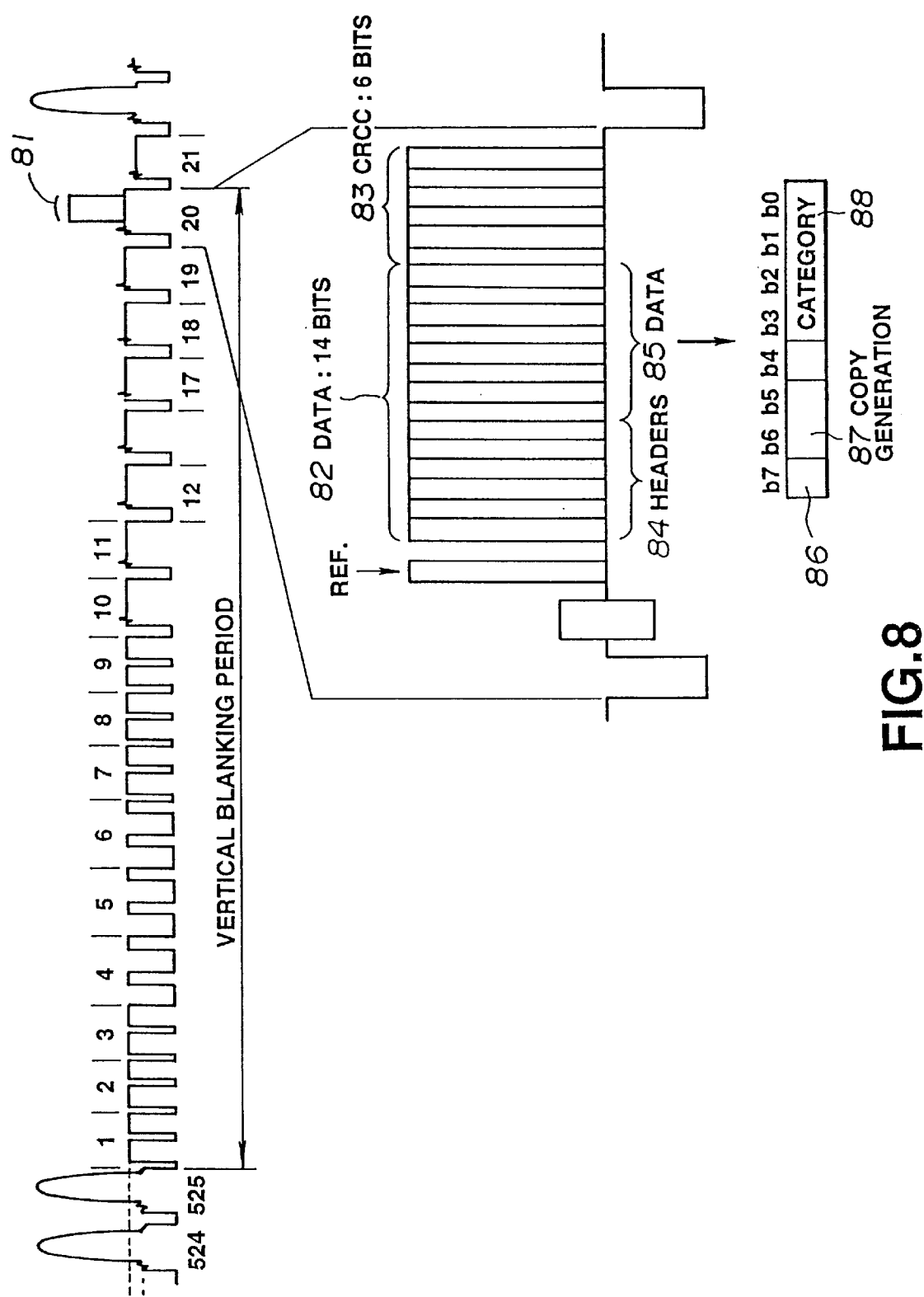
FIG. 8 illustrates an example of appendage of the playback mode information to analog video signals.

FIG. 8 shows an embodiment in which the playback mode information, in particular the copying management information, has been appended to analog video signals.

In FIG. 8, a protect code signal 81 is mixed in a pre-set horizontal period of a vertical blanking period of analog video signals. The horizontal period, during which the protect code 81 is arrayed, is the 20H and 283H for an odd field and for an even field, respectively, where H denotes a horizontal period. This protect code signal 81 is made up of, for example, 14-bit data 82 and a 6-bit error detection code (CRCC) 83. Of the 14-bit data 82, 8-bit data 85 next following a 6-bit header 84 represents the playback mode information, in particular the copying management information, which has been ciphered using the key information, as explained previously.

As an illustrative example of the contents of the data 85 specifying the 8-bit playback mode information, the most significant bit (MSB) 86 denotes copy inhibition or copy permission by "1" or "0", respectively, while the next following two bits denote the respective copying generations, that is the original, first copying generation, second copying generation and the third or higher copying generations by "00", "01", "10" and "11", respectively. The lower four bits 88 of the data 85 represent a category code of the reproducing device.

By ciphering the playback mode information for the video signals, the contents of the information cannot be known without the key information, such that the contents can be prohibited from being modified.

The present invention is not limited to the illustrative embodiments described above. For example, the present invention can be applied not only to recording/reproduction on or from a record medium but also the transmission of digital and analog signals in general. The playback mode information may also be modified with respect to the number of bits or contents or modified so as to contain the source contents or copying history.

What is claimed is:

1. A method of reproducing data from a record medium, wherein contents of said record medium are selected from the group consisting of audio data, video data and a combination of audio and video data, said method comprising:

reproducing from said record medium modulated program data having said contents and a modulated data-converted bit sequence used for preventing unauthorized copying of the record medium contents;

demodulating said modulated program data together with said data-converted bit sequence, wherein 16-bit coded program data is converted into 8-bit coded program data;

error correcting said demodulated program data together with said data-converted bit sequence;

separating header data at the leading end of each sector sectored in said record medium, wherein playback information having at least one item of copy managing information is separated from said header;

reconverting said bit sequence with ciphering key information that comprises at least one of: a production number of the record medium; producer identification information; distributor identification information; identification information of a recording device used to record the program data on the record medium; identification information of an encoder used to encode the record medium contents prior to being recorded on the record medium; and, identification information of a device that produced the record medium; and de-sectoring program data in terms of a pre-set data volume as a unit composed of 2,048 bytes of data.

2. The method of claim 1 wherein said data-converted bit sequence is recorded in a lead-in area of said record medium.

3. The method of claim 1 wherein said data-converted bit sequence is recorded in a selected sector of said record medium.

4. The method of claim 1 wherein said record medium is an optical disc.

5. The method of claim 1 wherein said device that produced the record medium is a cutting machine.

6. The method of claim 1 wherein said data-converted bit sequence was data-converted by means of a logical operation of data of the bit sequence and the ciphering key information.

7. The method of claim 6 wherein said logical operation is an exclusive OR operation.

8. The method of claim 1 wherein said data-converted bit sequence is recorded in a header area of a sector of said record medium.

9. The method of claim 1, wherein said data-converted bit sequence uses a pseudo-random number of the M sequence.

10. The method of claim 1 wherein said at least one item of copy managing information comprises copying generation data.

11. The method of claim 1 wherein said at least one item of copy managing information comprises a two bit copy permit/inhibit field.

12. A reproducing apparatus for reproducing data from a record medium, wherein contents of said record medium are selected from the group consisting of audio data, video data and a combination of audio and video data, said reproducing apparatus comprising:

means for reproducing from said record medium modulated program data having said contents and a modulated data-converted bit sequence used for preventing unauthorized copying of the record medium contents;

means for demodulating said modulated program data together with said data-converted bit sequence, wherein 16-bit coded program data is converted into 8-bit coded program data;

means for error correcting said demodulated program data together with said data-converted bit sequence;

means for separating header data at the leading end of each sector sectored in said record medium, wherein playback information having at least one item of copy managing information is separated from said header;

means for reconverting said bit sequence with ciphering key information that comprises at least one of: a production number of the record medium; producer identification information; distributor identification information; identification information of a recording device used to record the program data on the record medium; identification information of an encoder used to encode the record medium contents prior to being recorded on the record medium; and, identification information of a device that produced the record medium; and means for de-sectoring program data in terms of a pre-set data volume as a unit composed of 2,048 bytes of data.

13. The reproducing apparatus of claim 12 wherein said data-converted bit sequence is recorded in a lead-in area of said record medium.

14. The reproducing apparatus of claim 12 wherein said data-converted bit sequence is recorded in a selected sector of said record medium.

15. The apparatus of claim 12, wherein said data-converted bit sequence uses a pseudo-random number of the M sequence.

16. The apparatus of claim 12 wherein said at least one item of copy managing information comprises copying generation data.

17. The apparatus of claim 12 wherein said at least one item of copy managing information comprises a two bit copy permit/inhibit field.

* * * * *